United States Patent
Sakamoto et al.

(10) Patent No.: US 12,224,797 B2
(45) Date of Patent: Feb. 11, 2025

(54) OPTICAL WIRELESS COMMUNICATION DEVICE AND OPTICAL WIRELESS COMMUNICATION METHOD

(71) Applicant: NIPPON TELEGRAPH AND TELEPHONE CORPORATION, Tokyo (JP)

(72) Inventors: Kazumitsu Sakamoto, Musashino (JP); Yohei Katayama, Musashino (JP); Kento Yoshizawa, Musashino (JP); Takeshi Kinoshita, Musashino (JP); Etsushi Yamazaki, Musashino (JP); Takayuki Mizuno, Musashino (JP); Takuya Ohara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 154 days.

(21) Appl. No.: 18/009,382

(22) PCT Filed: Jun. 15, 2020

(86) PCT No.: PCT/JP2020/023331
§ 371 (c)(1),
(2) Date: Dec. 9, 2022

(87) PCT Pub. No.: WO2021/255771
PCT Pub. Date: Dec. 23, 2021

(65) Prior Publication Data
US 2023/0224036 A1    Jul. 13, 2023

(51) Int. Cl.
*H04B 10/112*    (2013.01)

(52) U.S. Cl.
CPC ..... *H04B 10/1129* (2013.01); *H04B 10/1123* (2013.01)

(58) Field of Classification Search
CPC .......... H04B 10/1129; H04B 10/1123
(Continued)

(56) References Cited

U.S. PATENT DOCUMENTS

| 9,755,739 | B1* | 9/2017 | Wang | H04B 10/118 |
| 11,005,565 | B1* | 5/2021 | Mitchell | H04B 10/118 |
| 11,212,010 | B2* | 12/2021 | Ueyno | H04B 1/16 |

FOREIGN PATENT DOCUMENTS

| EP | 3761528 A1 | 1/2021 |
| JP | 2005-229253 A | 8/2005 |

(Continued)

OTHER PUBLICATIONS

O'Brien et al; Transmitter and receiver technologies for optical wireless communication ; 2020; Royal society publishing; pp. 1-21. (Year: 2020).*

(Continued)

*Primary Examiner* — Amritbir K Sandhu

(57) ABSTRACT

A switching instructor outputs a beacon light selection notification signal when a optical transceiver transmits a optical wireless signal of a beacon light and outputs a signal light selection notification signal when the optical transceiver transmits the optical wireless signal of the signal light. A spatial light modulator controller performs switching of a control signal given to each of the plurality of pixels of a spatial light modulator to: cause a phase delay in light received by each of the plurality of pixels of the spatial light modulator when the switching instructor outputs the beacon light selection notification signal and cause a phase delay in light received by each of the plurality of pixels of the spatial light modulator when the switching instructor outputs the signal light selection notification signal.

4 Claims, 11 Drawing Sheets

(58) Field of Classification Search
USPC .......................................................... 398/115
See application file for complete search history.

(56) References Cited

FOREIGN PATENT DOCUMENTS

| | | | |
|---|---|---|---|
| JP | 2009-504110 A | 1/2009 | |
| JP | 2018-169437 A | 11/2018 | |
| JP | 2019-184943 A | 10/2019 | |
| WO | WO-2008/048219 A2 | 4/2008 | |
| WO | WO-2019207756 A1 * | 10/2019 | ......... H04B 10/1125 |

OTHER PUBLICATIONS

Y. Arimoto, "Multi-gigabit Free-space Optical Communication System with Bidirectional Beacon Tracking", IEEJ Trans. Fundamentals and Materials, vol. 127, No. 7, pp. 385-390, 2007.

\* cited by examiner

OPTICAL WIRELESS COMMUNICATION DEVICE AND OPTICAL WIRELESS COMMUNICATION METHOD

CROSS-REFERENCE TO RELATED APPLICATIONS

This application is a 371 U.S. National Phase of International Application No. PCT/JP2020/023331, filed on Jun. 15, 2020. The entire disclosure of the above application is incorporated herein by reference.

TECHNICAL FIELD

The present invention relates to an optical wireless communication apparatus and an optical wireless communication method.

BACKGROUND ART

Optical wireless communication that enables long-distance high-speed communication with small antennas has been studied as a means of wireless communication between the ground and a satellite and between a satellite and a satellite. In optical wireless communication, signal light is transmitted and received to and from a distant opposite station using an optical antenna having a narrow beam width in order to reduce spatial propagation loss of transmitted light. In optical wireless communication, it is necessary to capture the opposite station before transmitting and receiving signal light. Here, the opposite station is captured by transmitting beacon light using an optical antenna having a wider beam width than that of signal light such that the opposite station can be easily captured.

FIG. 11 is a block diagram illustrating a configuration of an optical wireless communication system 100 showing an overview of a technology disclosed in NPL 1. In the technique disclosed in NPL 1, each of the opposite optical wireless communication apparatuses 110-1 and 110-2 transmits beacon light 90-1 and 90-2 to each other using an optical antenna having a wide beam width to capture the opposite optical wireless communication apparatus 110-2 and 110-1. The respective optical wireless communication apparatuses 110-1 and 110-2 transmit signal light 91-1 and 91-2 using an optical antenna having a narrow beam width after capturing each other.

CITATION LIST

Non Patent Literature

[NPL 1] Y. Arimoto, "Multi-gigabit Free-space Optical Communication System with Bidirectional Beacon Tracking," IEEJ Trans. Fundamentals and Materials, vol. 127, no. 7, pp. 385-390, 2007

SUMMARY OF THE INVENTION

Technical Problem

As illustrated in FIG. 11, the optical wireless communication apparatuses 110-1 and 110-2 include beacon light transmitting/receiving units 111-1 and 111-2 and lenses 113-1 and 113-2 for transmitting beacon light 90-1 and 90-2, respectively. The optical wireless communication apparatuses 110-1 and 110-2 also include signal light transmitting/receiving units 112-1 and 112-2 and lenses 114-1 and 114-2 for transmitting signal light 91-1 and 91-2, respectively.

That is, in the optical wireless communication system 100, it is necessary to provide double optical amplifiers in the beacon light transmitting/receiving unit 111-1 and 111-2 and the signal light transmitting/receiving unit 112-1 and 112-2. Further, in the optical wireless communication system 100, it is necessary to provide double lenses, each forming an optical antenna, as the lens 113-1 and 113-2 for the beacon light 90-1 and 90-2 and the lens 114-1 and 114-2 for the signal light 91-1 and 91-2. Thus, there is a problem that it is difficult to reduce the size and cost of the optical wireless communication apparatuses 110-1 and 110-2.

In view of the above circumstances, it is an object of the present invention to provide a technique capable of reducing the size and cost of an optical wireless communication apparatus while enabling transmission of both beacon light and signal light.

Means for Solving the Problem

An aspect of the present invention is an optical wireless communication apparatus including an optical transmitting/receiving unit configured to transmit an optical wireless signal of beacon light or signal light and receive an optical wireless signal transmitted by another optical wireless communication apparatus, a switching instruction unit configured to output a beacon light selection notification signal when the optical transmitting/receiving unit transmits the optical wireless signal of the beacon light and output a signal light selection notification signal when the optical transmitting/receiving unit transmits the optical wireless signal of the signal light upon receiving an optical wireless signal of the beacon light from the other optical wireless communication apparatus, an optical antenna arranged at a position where light of the optical wireless signal transmitted by the optical transmitting/receiving unit is converted into and emitted as parallel light, a spatial light modulator arranged at a position where the spatial light modulator receives the parallel light emitted by the optical antenna, the spatial light modulator having a plurality of pixels, each of which causes a phase delay in light received by the pixel based on a given control signal, and a spatial light modulator control unit configured to perform switching of the control signal given to each of the plurality of pixels of the spatial light modulator to: cause a phase delay, which causes a beam width of the beacon light to be wider than a beam width of parallel light, in light received by each of the plurality of pixels of the spatial light modulator when the switching instruction unit outputs the beacon light selection notification signal, cause a phase delay, which causes a beam width of the signal light to be equal to a beam width of parallel light, in light received by each of the plurality of pixels of the spatial light modulator when the switching instruction unit outputs the signal light selection notification signal.

An aspect of the present invention is an optical wireless communication method for an optical wireless communication apparatus including a switching instruction unit, an optical transmitting/receiving unit configured to transmit and receive an optical wireless signal, an optical antenna arranged at a position where light of the optical wireless signal transmitted by the optical transmitting/receiving unit is converted into and emitted as parallel light, a spatial light modulator arranged at a position where the spatial light modulator receives the parallel light emitted by the optical antenna, the spatial light modulator having a plurality of pixels, each of which causes a phase delay in light received by the pixel based on a given control signal, and a spatial light modulator control unit, wherein the switching instruction unit outputs a beacon light selection notification signal, the optical transmitting/receiving unit transmits an optical wireless signal of beacon light, the optical antenna converts light of the optical wireless signal transmitted by the optical transmitting/receiving unit into parallel light and emits the parallel light to the spatial light modulator, the spatial light modulator control unit receives the beacon light selection notification signal output by the switching instruction unit and gives, to each of the plurality of pixels of the spatial light modulator, the control signal which causes a phase delay, which causes the beam width of the beacon light to be wider than a beam width of parallel light, in light received by each of the plurality of pixels of the spatial light modulator, the switching instruction unit outputs a signal light selection notification signal when the optical transmitting/receiving unit has received an optical wireless signal of the beacon light from another optical wireless communication apparatus, the optical transmitting/receiving unit transmits an optical wireless signal of the signal light, the optical antenna converts light of the optical wireless signal transmitted by the optical transmitting/receiving unit into parallel light and emits the parallel light to the spatial light modulator, and the spatial light modulator control unit receives the signal light selection notification signal output by the switching instruction unit and performs switching of the control signal given to each of the plurality of pixels of the spatial light modulator to cause a phase delay, which causes a beam width of the signal light to be equal to a beam width of parallel light, in light received by each of the plurality of pixels of the spatial light modulator.

Effects of the Invention

According to the present invention, it is possible to reduce the size and cost of an optical wireless communication apparatus while enabling transmission of both beacon light and signal light.

DESCRIPTION OF EMBODIMENTS

First Embodiment

Figure 1:
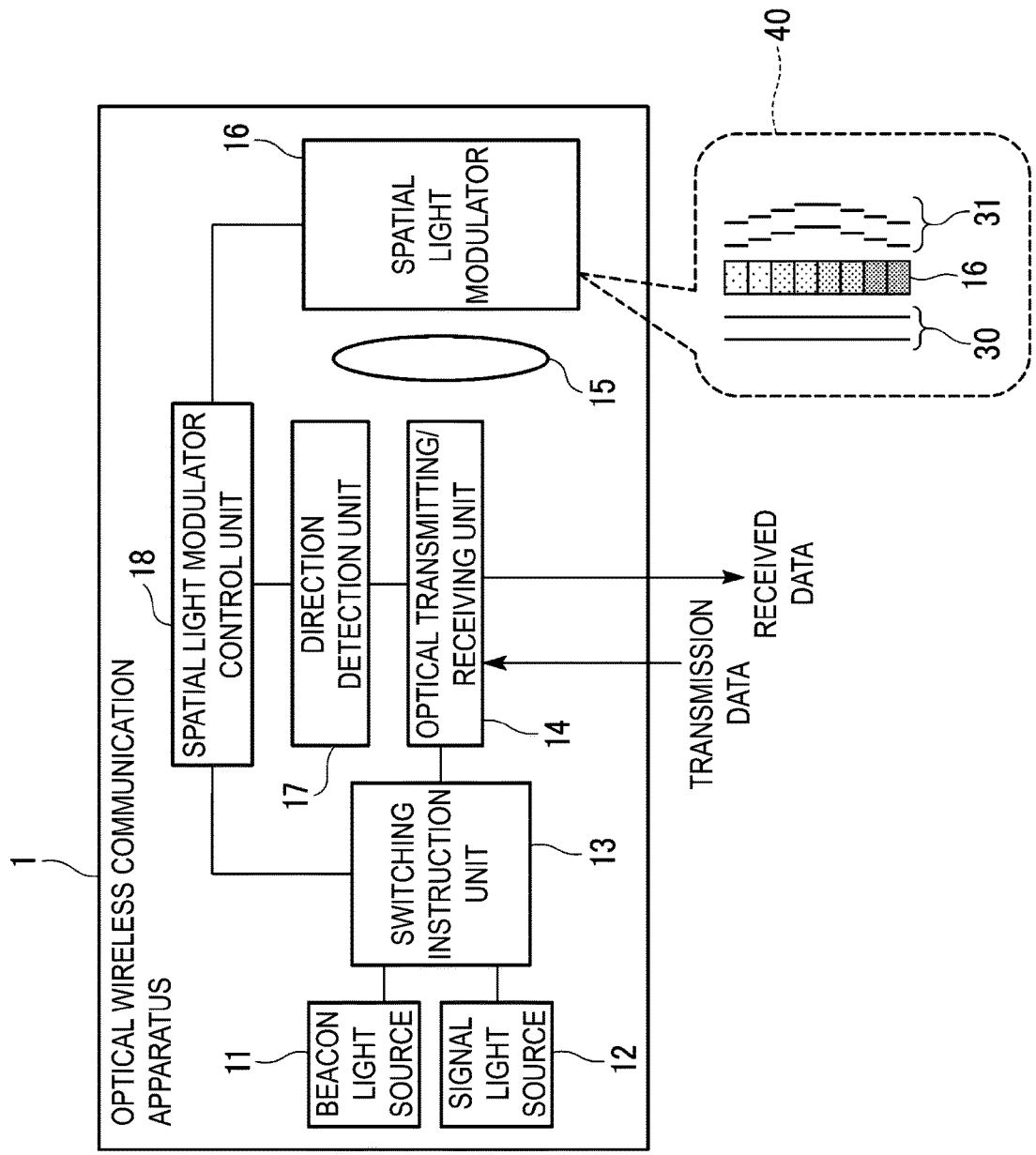
FIG. 1 is a (first) diagram including a block diagram illustrating a configuration of an optical wireless communication apparatus according to a first embodiment and a supplementary diagram.

Hereinafter, embodiments of the present invention will be described with reference to the drawings. FIG. 1 is a diagram including a block diagram illustrating a configuration of an optical wireless communication apparatus 1 of a first embodiment and a supplementary diagram indicated by reference sign 40.

The optical wireless communication apparatus 1 includes a beacon light source 11, a signal light source 12, a switching instruction unit (switching instructor) 13, an optical transmitting/receiving unit (optical transceiver) 14, a lens 15, a spatial light modulator 16, a direction detection unit (direction detector) 17, and a spatial light modulator control unit (spatial light modulator controller) 18.

The beacon light source 11 emits beacon light having a predetermined wavelength. The signal light source 12 emits signal light having a predetermined wavelength.

The switching instruction unit 13 receives the beacon light emitted by the beacon light source 11 and the signal light emitted by the signal light source 12. The switching instruction unit 13 selects one of the received light beams and emits the selected light beam to the optical transmitting/receiving unit 14. The switching instruction unit 13 selects the beacon light emitted by the beacon light source 11 in an initial state in which the optical wireless communication apparatus 1 is powered on and started. Upon receiving a capture notification signal from the optical transmitting/receiving unit 14, the switching instruction unit 13 selects the signal light emitted by the signal light source 12.

The connection between the switching instruction unit 13 and each of the beacon light source 11 and the signal light source 12 and the connection between the switching instruction unit 13 and the optical transmitting/receiving unit 14 are connections using optical means, and each of the connections may be established by an optical waveguide such as an optical fiber or may be established via an optical system such as a mirror. Not only the connection using optical means for propagating beacon light or signal light but also a connection via an electric line that the optical transmitting/receiving unit 14 uses to transmit a capture notification signal are established between the switching instruction unit 13 and the optical transmitting/receiving unit 14.

The switching instruction unit 13 is connected to the spatial light modulator control unit 18 by an electric line. Upon selecting the beacon light emitted by the beacon light source 11, the switching instruction unit 13 outputs a beacon light selection notification signal to the spatial light modulator control unit 18. Upon selecting the signal light emitted by the signal light source 12, the switching instruction unit 13 outputs a signal light selection notification signal to the spatial light modulator control unit 18.

If the switching instruction unit 13 selects the beacon light source 11 and receives and emits beacon light from the beacon light source 11, the optical transmitting/receiving unit 14 receives the beacon light emitted by the switching instruction unit 13. Then, the optical transmitting/receiving unit 14 amplifies the beacon light through an optical amplifier provided therein and transmits the amplified beacon light as an optical wireless signal.

The optical transmitting/receiving unit 14 is provided with an optical modulator inside. If the switching instruction unit 13 receives and emits signal light from the signal light source 12, the optical transmitting/receiving unit 14 receives the signal light emitted by the switching instruction unit 13. The optical transmitting/receiving unit 14 superimposes transmission data given from the outside on the received signal light through the optical modulator. The optical transmitting/receiving unit 14 amplifies the signal light on which the transmission data has been superimposed through the optical amplifier used to amplify the beacon light and transmits the amplified signal light as an optical wireless signal.

The optical transmitting/receiving unit 14 includes, for example, a beam splitter that splits light. Further, the optical transmitting/receiving unit 14 includes a photodetector on one of optical paths into which the beam splitter splits light. This photodetector is a four-quadrant photodetector called a quadrant detector as shown in the following reference, which detects that light has been received and also detects light reception position information indicating a position on a light receiving surface of the photodetector where the light has been received.

Reference: Quadrant Position Photodiode Detector, [online], [retrieved Jun. 9, 2020], Internet (URL: https://www.thorlabs.co.jp/newgrouppage9.cfm?objectgroup_id=4400)

Upon receiving an optical wireless signal, the optical transmitting/receiving unit 14 splits the received light of the optical wireless signal by the beam splitter. When the photodetector provided inside has detected light, the optical transmitting/receiving unit 14 determines that beacon light has been received.

The optical transmitting/receiving unit 14 is connected to the direction detection unit 17 by an electric line, and upon determining that beacon light has been received, the optical transmitting/receiving unit 14 outputs light reception position information indicating a position on the light receiving surface of the photodetector where the light has been received to the direction detection unit 17 and outputs a capture notification signal to the switching instruction unit 13.

The optical transmitting/receiving unit 14 is provided with an optical demodulator inside. The optical demodulator is provided on the other optical path into which the beam splitter splits light. Upon receiving an optical wireless signal of signal light, the optical demodulator provided inside the optical transmitting/receiving unit 14 demodulates the received optical wireless signal of the signal light to detect received data and outputs the detected received data outside.

The lens 15 is, for example, a convex lens or a lens that combines a convex lens and a concave lens. The lens 15 is arranged at a position where the lens 15 converts the beam of an optical wireless signal of beacon light or signal light transmitted by the optical transmitting/receiving unit 14 into parallel light. That is, the lens 15 is arranged at a position where the optical axis of light emitted by the optical transmitting/receiving unit 14 coincides with the optical axis of the lens 15 and a light emission position on the optical transmitting/receiving unit 14 coincides with the focal point of the lens 15.

The direction detection unit 17 is connected to the optical transmitting/receiving unit 14 by an electric line as described above. The direction detection unit 17 detects the direction of arrival of beacon light. Specifically, the direction detection unit 17 detects the direction of arrival of beacon light by performing calculation to estimate the direction of the optical axis of the beacon light that has arrived based on light reception position information, output by the optical transmitting/receiving unit 14, indicating a position on the light receiving surface of the photodetector where the light has been received. The direction detection unit 17 is connected to the spatial light modulator control unit 18 by an electric line. The direction detection unit 17 outputs information indicating the detected direction of arrival of the beacon light to the spatial light modulator control unit 18.

The spatial light modulator 16 is connected to the spatial light modulator control unit 18 by an electric line. The spatial light modulator 16 is a planar device in which a plurality of liquid crystal pixels are arranged in a matrix, and for example, a transmissive spatial light modulator (SLM) is applied as the spatial light modulator 16. The spatial light modulator 16 is arranged such that the optical axis direction of the lens 15 and the plane of the spatial light modulator 16 are perpendicular to each other and the optical axis of the lens 15 passes through a central pixel of the spatial light modulator 16.

For example, when the number of pixels in each row of the spatial light modulator 16 is N, the number of pixels in each column is M, and both N and M are odd numbers of 3 or more, a pixel at the position of a value obtained by adding 1 to the quotient of N/2 and at the position of a value obtained by adding 1 to the quotient of M/2 is determined as the central pixel. When either N or M is an even number of 2 or more and the other is an odd number of 3 or more, two pixels are located at the center and thus any one of the two pixels is determined as the center pixel. When both N and M are even numbers of 2 or more, four pixels are located at the center and thus any one of the four pixels is determined as the center pixel. Any one of any pixels near the center included in the spatial light modulator 16, rather than a pixel at the central as described above, may be determined as the central pixel of the spatial light modulator 16. Information indicating the position of the central pixel determined in advance is stored in an internal storage area of the spatial light modulator control unit 18 in advance because the spatial light modulator control unit 18 needs it when determining the amount of phase shift given to each pixel of the spatial light modulator 16.

When an amount of phase shift to each pixel is given by an electric control signal output by the spatial light modulator control unit 18, the spatial light modulator 16 causes a phase delay corresponding to the amount of phase shift in light transmitted through each pixel. For example, it is assumed that the amount of phase shift is given such that the amount of phase delay increases as the distance from the central pixel of the spatial light modulator 16 increases as illustrated in the supplementary diagram indicated by reference sign 40. In this case, if a wavefront 30 of parallel light emitted by the lens 15 is incident on the spatial light modulator 16, the shape of the wavefront 30 changes to the shape of a wavefront 31, thus widening the beam width of the light.

Upon receiving a beacon light selection notification signal from the switching instruction unit 13, the spatial light modulator control unit 18 gives an amount of phase shift, which makes the beam width of light transmitted through the spatial light modulator 16 wider than the beam width of the parallel light, to each pixel of the spatial light modulator 16 by a control signal. Upon receiving a signal light selection notification signal from the switching instruction unit 13, the spatial light modulator control unit 18 narrows the beam width of light transmitted through the spatial light modulator 16 such that it becomes the beam width of the parallel light. Further, when the direction of arrival of beacon light is not from the front, the spatial light modulator control unit 18 gives an amount of phase shift, which causes the direction of light transmitted through the spatial light modulator 16 to be directed in the direction of arrival of the beacon light received from the direction detection unit 17, to each pixel of the spatial light modulator 16 by a control signal.

In the initial state, that is, when each pixel of the spatial light modulator 16 is not individually controlled, the spatial light modulator control unit 18 gives an amount of phase shift, which causes the same fixed amount of phase delay in light transmitted through each pixel of the spatial light modulator 16, to each pixel of the spatial light modulator 16 by a control signal as an initial value. In this case, if parallel light is incident perpendicular to the plane of the spatial light modulator 16, the incident parallel light undergoes the same phase delay when it is transmitted through each pixel. Thus, the incident parallel light is emitted from the spatial light modulator 16 while maintaining the state of parallel light.

Process Performed by Optical Wireless Communication Apparatus in First Embodiment Next, a process performed by the optical wireless communication apparatus 1 of the first embodiment will be described. An optical wireless communication system 5 illustrated in FIG. 2 includes two optical wireless communication apparatuses 1-1 and 1-2, each having the same configuration as the optical wireless communication apparatus 1 of the first embodiment. Of functional units of the two optical wireless communication apparatuses 1-1 and 1-2 corresponding to the functional units included in the optical wireless communication apparatus 1, those of the optical wireless communication apparatus 1-1 will be indicated by a branch number "-1" added and those of the optical wireless communication apparatus 1-2 will be indicated by a branch number "-2" added.

Figure 2:
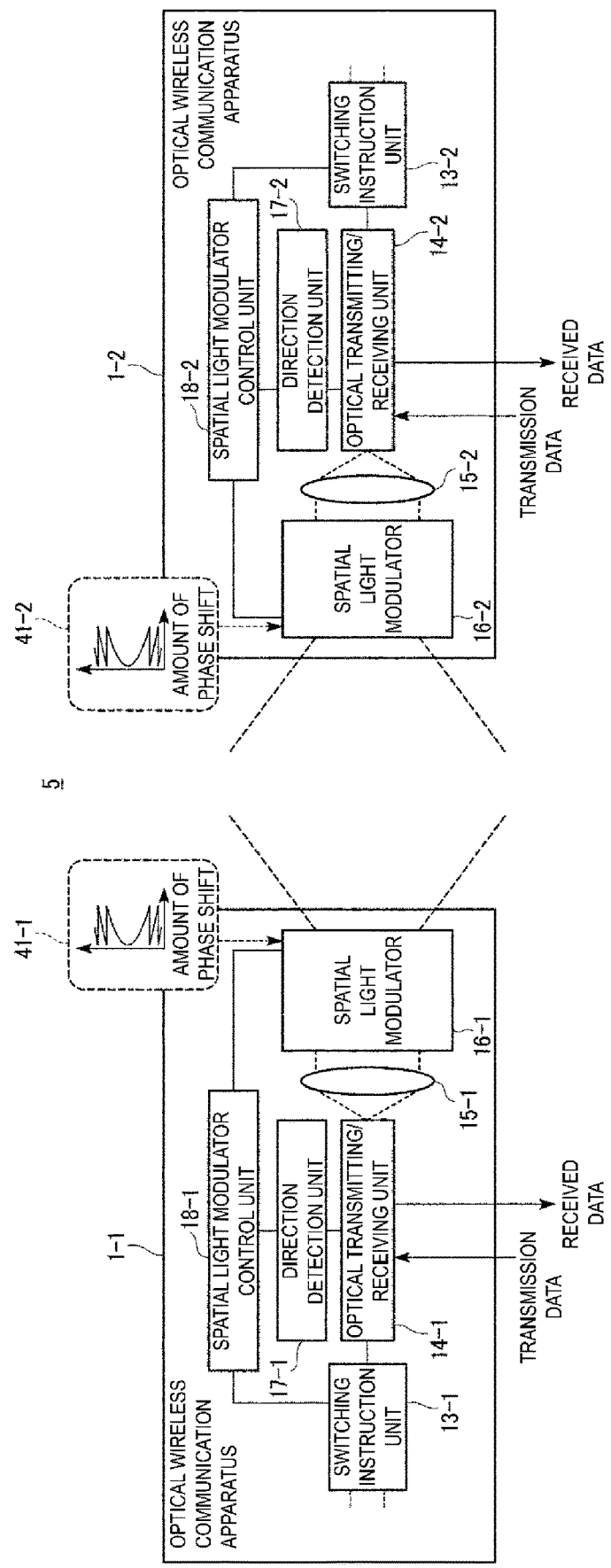
FIG. 2 is a (first) diagram including a block diagram illustrating a configuration of an optical wireless communication system according to the first embodiment and a supplementary diagram.

The beacon light sources 11-1 and 11-2 and the signal light sources 12-1 and 12-2 provided respectively in the optical wireless communication apparatuses 1-1 and 1-2 are omitted in FIG. 2. However, it is assumed that the beacon light source 11-1 and the signal light source 12-1 are connected to the switching instruction unit 13-1 by optical means and the beacon light source 11-2 and the signal light source 12-2 are connected to the switching instruction unit 13-2 by optical means.

Figure 3:
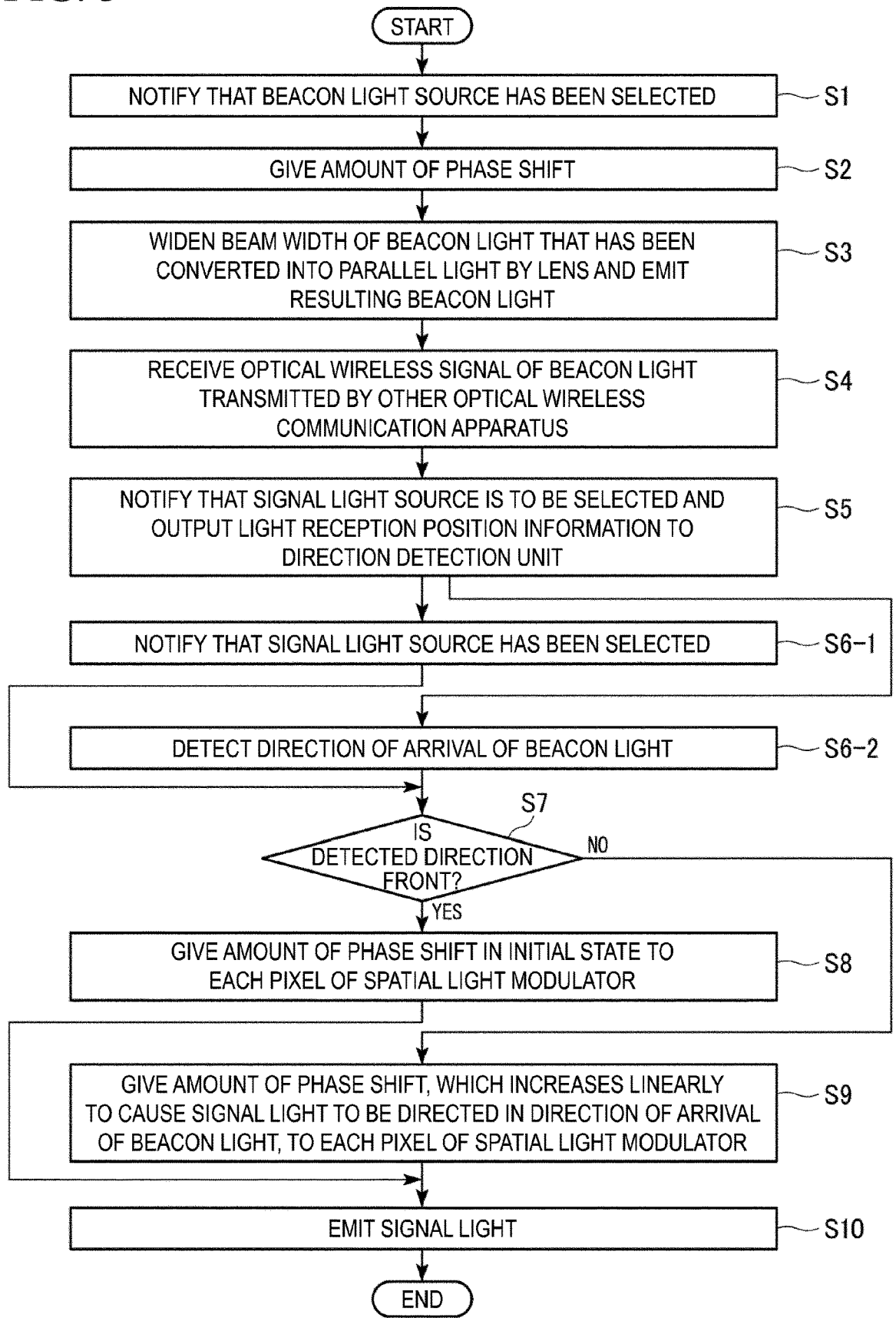
FIG. 3 is a flowchart illustrating a flow of a process performed by the optical wireless communication apparatus of the first embodiment.

FIG. 3 is a flowchart illustrating a process performed by each of the optical wireless communication apparatuses 1-1 and 1-2 of the optical wireless communication system 5. The optical wireless communication apparatuses 1-1 and 1-2 perform the same process. Thus, the process performed by the optical wireless communication apparatus 1-1 will be described below.

When the optical wireless communication apparatus 1-1 is powered on and started, the beacon light source 11-1 starts emitting beacon light. The signal light source 12-1 also starts emitting signal light. The switching instruction unit 13-1 selects the beacon light emitted by the beacon light source 11-1. The switching instruction unit 13-1 outputs a beacon light selection notification signal to the spatial light modulator control unit 18-1 (step S1).

Figure 4:
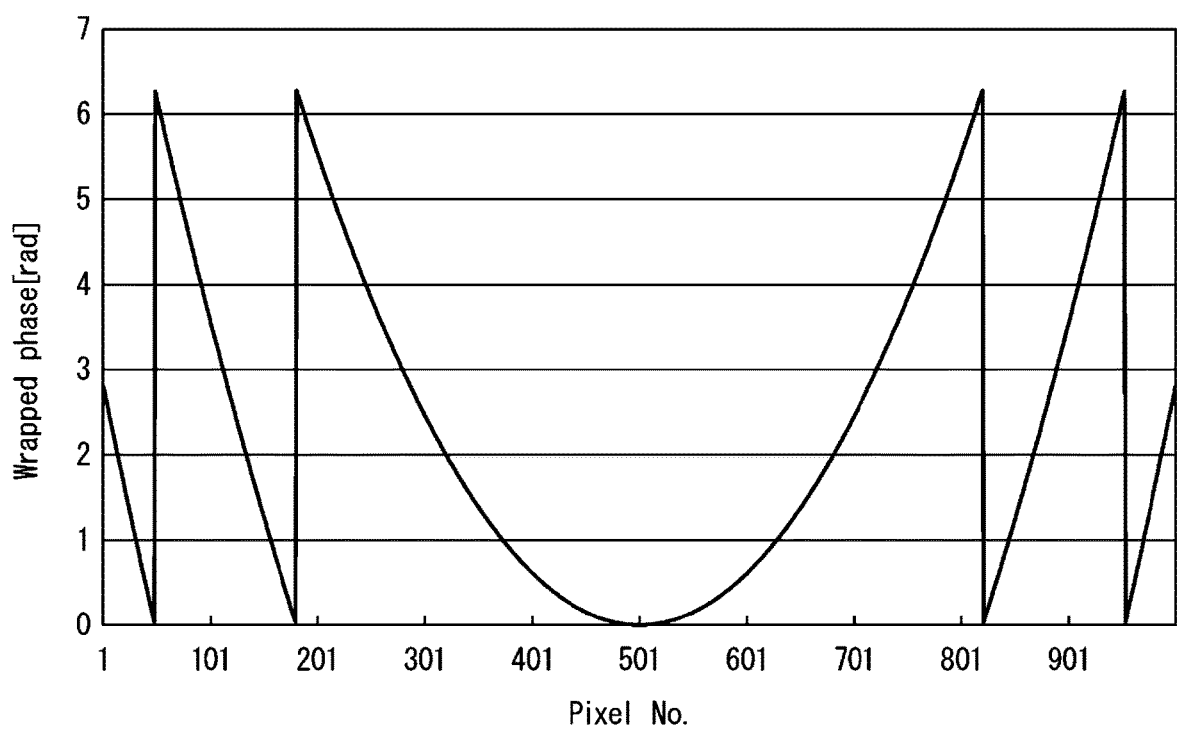
FIG. 4 is a graph showing the characteristics of an amount of phase shift given to each pixel of a spatial light modulator according to the first embodiment.

Upon receiving the beacon light selection notification signal from the switching instruction unit 13-1, the spatial light modulator control unit 18-1 gives an amount of phase shift having, for example, characteristics shown in a graph illustrated in FIG. 4 to each pixel of the spatial light modulator 16-1 by a control signal (step S4).

Here, the spatial light modulator 16-1 has a configuration including, for example, 1001 pixels in each row and 1001 pixels in each column, that is, a total of 1001×1001 pixels. Then, it is assumed that a pixel with row number 501 and column number 501 is predetermined as a central pixel. The graph illustrated in FIG. 4 shows the characteristics of one row including the central pixel or one column including the central pixel of the spatial light modulator 16-1. The horizontal axis represents "Pixel No.," that is, the pixel number in the row direction or the column direction. Pixel numbers are assigned to the pixels of each row and column in the order of 1, 2, 3 . . . from the beginning pixel. The vertical axis represents an amount of phase shift given to each pixel, that is, an amount of phase delay (wrapped phase) given to light passing through each pixel, the units of which are radians [rad].

FIG. 4 shows a change in the amount of phase delay in one row including the central pixel or one column including the central pixel of the spatial light modulator 16-1 as described above. Thus, the change in the amount of phase delay for all pixels of the spatial light modulator 16-1 is represented by a three-dimensional shape. A range of the three-dimensional shape from the central pixel with pixel number 501 to a pixel at which the amount of phase delay first reaches "$2\pi$" which is the upper limit of the amount of phase delay has a shape of a concave curved surface which is most recessed at the central pixel.

The spatial light modulator control unit 18-1 gives an amount of phase shift to each pixel of the spatial light modulator 16-1 by a control signal such that a phase delay which increases exponentially with a distance from the central pixel is caused in light transmitted through each pixel of the spatial light modulator 16-1 as illustrated in FIG. 4.

In the characteristics illustrated in FIG. 4, the amount of phase delay returns to 0 radians in the vicinity of pixel numbers 181 and 821 and in the vicinity of pixel numbers 41 and 961. This is because the amount of phase delay reaches the upper limit of $2\pi$ radians. Even if the amount of phase delay returns to 0 radians, the exponential increase in the amount of phase delay is maintained. Thus, a pixel at which $2\pi$ radians is first reached from the pixel with the pixel number 501 which is the central pixel is a pixel near that of the pixel number 181 which is about 320 pixels apart from it, whereas a pixel at which $2\pi$ radians is reached from the pixel near that of the pixel number 181 is a pixel near that of the pixel number 41 which is about 140 pixels apart from it.

The characteristics of the amount of phase delay that increases exponentially with the distance from the central pixel illustrated in FIG. 4 are an example. The characteristics of the amount of phase delay may be characteristics to which an exponential function is applied, characteristics to which a quadratic function is applied, or characteristics to which other functions are applied as long as the characteristics are those which have the shape of a concave curved surface that is most recessed at the central pixel and in which the amount of phase delay increases sharply with the distance from the central pixel.

Figure 5:
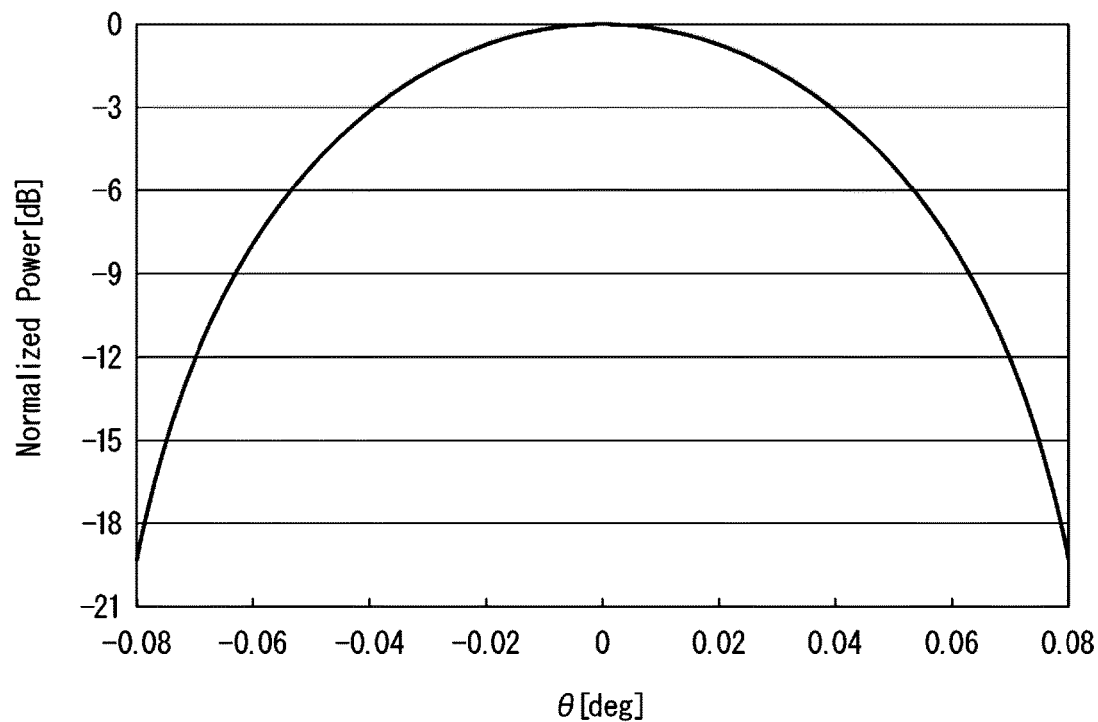
FIG. 5 is a diagram illustrating the characteristics of the power of light emitted by the spatial light modulator when a spatial light modulator control unit is in an initial state according to the first embodiment.
Figure 6:
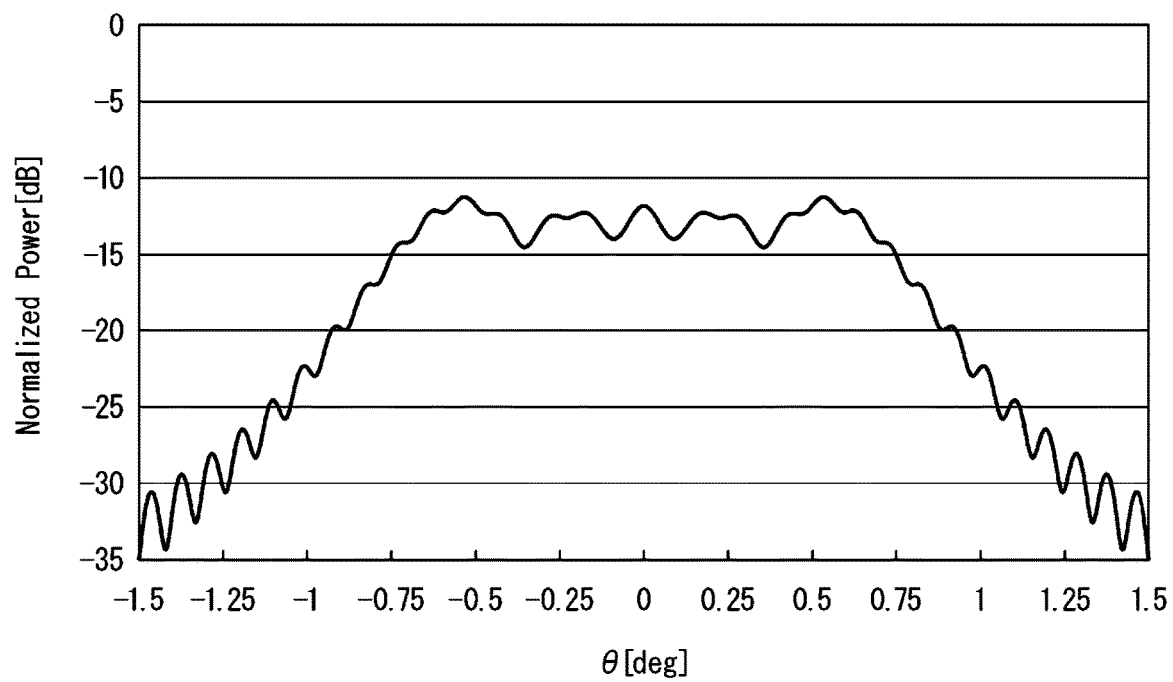
FIG. 6 is a diagram illustrating the characteristics of the power of light emitted by the spatial light modulator when the amount of phase shift of the characteristics illustrated in FIG. 4 is given to each pixel of the spatial light modulator according to the first embodiment.

FIGS. 5 and 6 are graphs measuring the power of parallel light from the lens 15-1 after it has passed through each pixel of the spatial light modulator 16-1, that is, the power of light emitted from the spatial light modulator 16-1. The horizontal axis represents an angle θ formed from a predetermined measurement position on a straight line that passes through the central pixel of the spatial light modulator 16-1 and is perpendicular to the plane of the spatial light modulator 16-1, the units of which are degrees [deg]. The vertical axis represents the normalized power of light, the units of which are decibels [dB].

FIG. 5 is a graph when the spatial light modulator control unit 18-1 is in an initial state and thus an amount of phase shift which causes the same fixed amount of phase delay is given to each pixel. That is, if parallel light from the lens 15-1 is incident on the spatial light modulator 16-1, the incident parallel light undergoes the same phase delay when it is transmitted through each pixel. Therefore, the spatial light modulator 16-1 emits the parallel light while maintaining the state of parallel light. Thus, FIG. 5 can be said to be a graph measuring the power of light when the spatial light modulator 16-1 emits parallel light.

On the other hand, FIG. 6 is a graph when the spatial light modulator control unit 18-1 gives an amount of phase shift having the characteristics illustrated in the graph shown in FIG. 4 to each pixel of the spatial light modulator 16-1 by a control signal. The values of the normalized power of light on the vertical axis of FIG. 6 are those normalized by the optical power at θ=0 degrees in FIG. 5 and therefore the maximum value on the vertical axis of FIG. 6 is not 0 dB unlike in FIG. 5.

As can be seen by comparing FIGS. 5 and 6, the full width at half maximum is about 0.08° in FIG. 5, while the full width at half maximum is about 1.5° in FIG. 6 and thus it can be seen that the beam width can be widened by about 19 times by giving an amount of phase shift having the characteristics illustrated in the graph shown in FIG. 4 to each pixel of the spatial light modulator 16-1.

The optical transmitting/receiving unit 14-1 receives beacon light that the switching instruction unit 13-1 has received and emitted from the beacon light source 11-1. The optical transmitting/receiving unit 14-1 transmits the received beacon light as an optical wireless signal. The lens 15-1 converts the incident beacon light into parallel light and emits the parallel light to the spatial light modulator 16-1. The spatial light modulator 16-1 in which an amount of phase shift having the characteristics illustrated in the graph shown in FIG. 4 is given to each pixel widens the beam width of the beacon light of the incident parallel light and emits the resulting beacon light into the air as shown by dashed lines in FIG. 2 (step S3).

If the opposite optical wireless communication apparatus 1-2 performs the processing of steps S1 to S3 in the same manner as in the optical wireless communication apparatus 1-1, an optical wireless signal of beacon light transmitted by the optical wireless communication apparatus 1-2 arrives at the optical wireless communication apparatus 1-1. The optical wireless signal of the beacon light that has arrived from the optical wireless communication apparatus 1-2 is transmitted through the spatial light modulator 16-1 and the lens 15-1 of the optical wireless communication apparatus 1-1. The optical transmitting/receiving unit 14-1 receives the transmitted optical wireless signal of the beacon light (step S4).

The photodetector included in the optical transmitting/receiving unit 14-1 detects the beacon light split off by the beam splitter. Thereby, the optical transmitting/receiving unit 14-1 determines that the optical wireless signal of the beacon light transmitted by the optical wireless communication apparatus 1-2 has been received. Upon determining that the optical wireless signal of the beacon light transmitted by the optical wireless communication apparatus 1-2 has been received, the optical transmitting/receiving unit 14-1 outputs light reception position information indicating a position on the light receiving surface of the photodetector where the light has been received to the direction detection unit 17-1 and outputs a capture notification signal to the switching instruction unit 13-1 (step S5).

Upon receiving the capture notification signal from the optical transmitting/receiving unit 14-1, the switching instruction unit 13-1 selects and receives the signal light emitted by the signal light source 12-1. The switching instruction unit 13-1 emits the received signal light to the optical transmitting/receiving unit 14-1. The switching instruction unit 13-1 outputs a signal light selection notification signal to the spatial light modulator control unit 18-1 (step S6-1).

In parallel with the processing of step S6-1, the direction detection unit 17-1 performs calculation to estimate the direction of the optical axis of the beacon light transmitted by the optical wireless communication apparatus 1-2 based on the light reception position information received from the optical transmitting/receiving unit 14-1. Thereby, the direction detection unit 17-1 detects the direction of arrival of the beacon light, that is, the direction in which the optical wireless communication apparatus 1-2 is present. The direction detection unit 17-1 outputs information indicating the detected direction of arrival of the beacon light to the spatial light modulator control unit 18-1 (step S6-2).

Upon receiving the signal light selection notification signal from the switching instruction unit 13-1, the spatial light modulator control unit 18-1 acquires information indicating the direction of arrival of the beacon light output by the direction detection unit 17-1. The spatial light modulator control unit 18-1 determines whether the information indicating the direction of arrival of the beacon light indicates the front (step S7).

Figure 7:
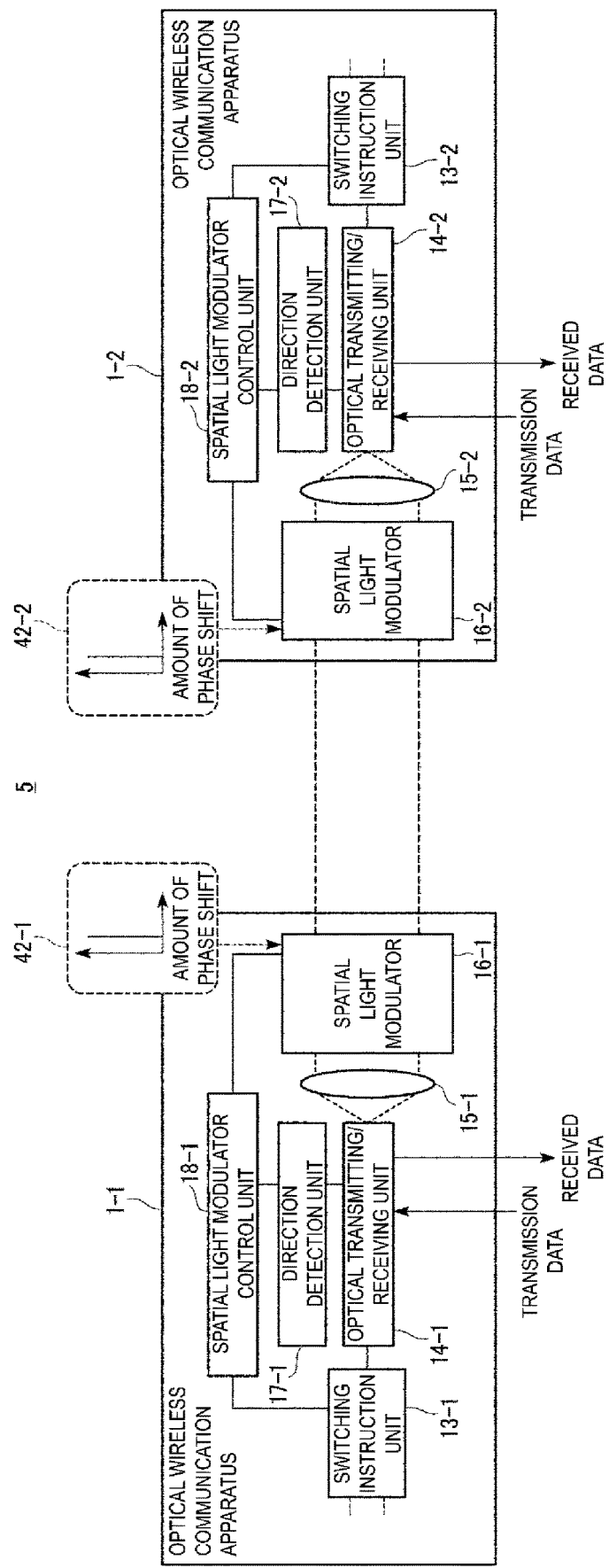
FIG. 7 is a (second) diagram including a block diagram illustrating a configuration of an optical wireless communication system according to the first embodiment and a supplementary diagram.

Upon determining that the information indicating the direction of arrival of the beacon light indicates the front (Yes in step S7), the spatial light modulator control unit 18-1 returns to the initial state and gives an amount of phase shift, which causes the same fixed phase delay, to each pixel of the spatial light modulator 16-1 by a control signal as indicated by reference sign 42-1 in FIG. 7 (step S8). Thereby, if parallel signal light is incident on the spatial light modulator 16-1 when the optical transmitting/receiving unit 14-1 transmits an optical wireless signal of the signal light, the signal light of the incident parallel light undergoes the same phase delay when it is transmitted through each pixel. Thus, the signal light is transmitted through the pixels of the spatial light modulator 16-1 while maintaining the state of parallel light and propagates to the optical wireless communication apparatus 1-2 in the state of parallel light with a beam width narrower than that of the beacon light as shown by dashed lines in FIG. 7.

On the other hand, upon determining that the information indicating the direction of arrival of the beacon light does not indicate the front (No in step S7), the spatial light modulator control unit 18-1 gives am amount of phase shift to each pixel of the spatial light modulator 16-1 by a control signal such that the direction of the signal light transmitted through the spatial light modulator 16-1 is directed in the direction of arrival of the beacon light received from the direction detection unit 17-1 (step S9). Specifically, the spatial light modulator control unit 18-1 gives an amount of phase shift, which increases linearly with an inclination corresponding to the direction of arrival of the beacon light as illustrated in a supplementary diagram of reference sign 43 in FIG. 8, to each pixel of the spatial light modulator 16-1 by a control signal.

Figure 8:
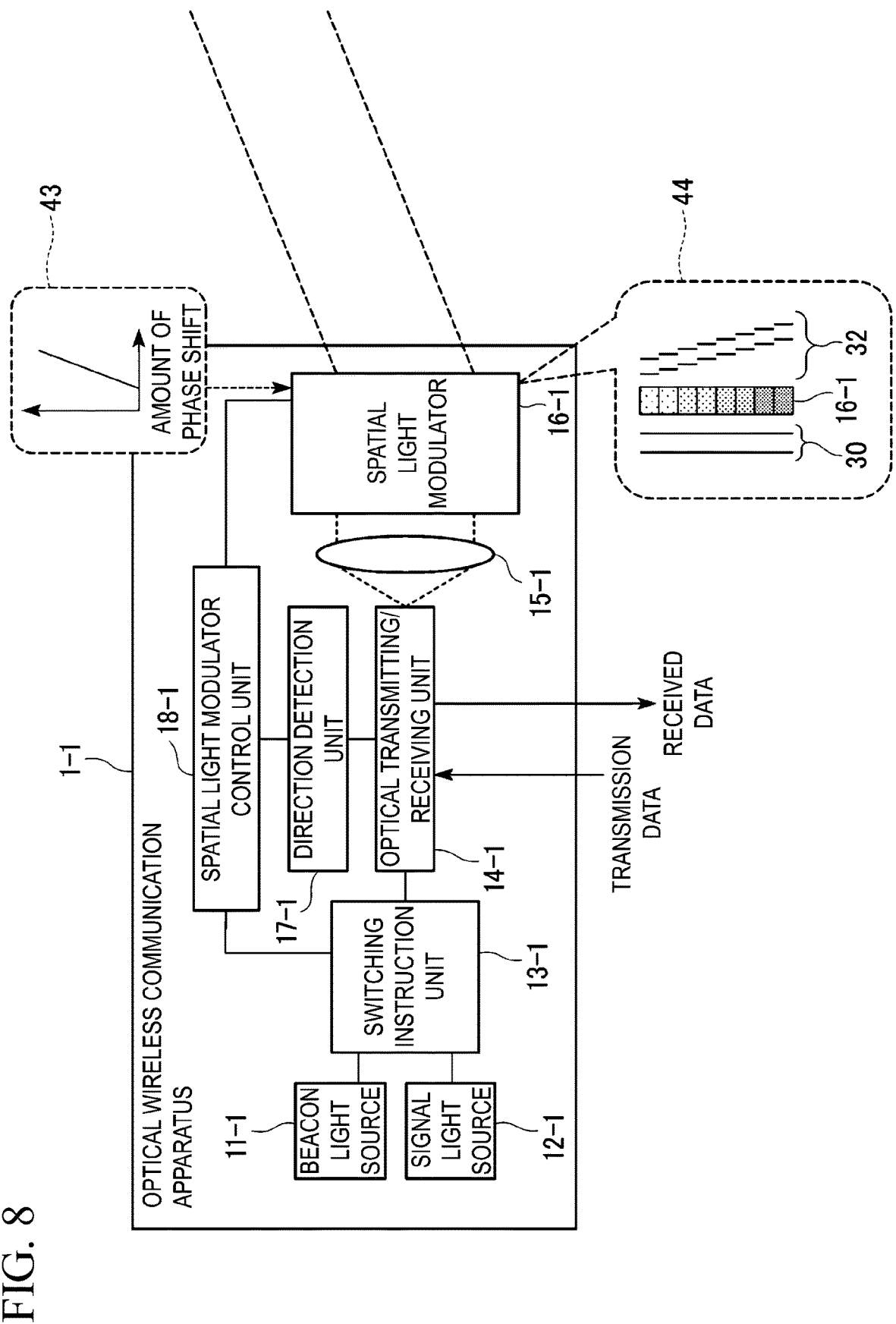
FIG. 8 is a (second) diagram including a block diagram illustrating a configuration of an optical wireless communication apparatus according to the first embodiment and a supplementary diagram.

Due to the amount of phase shift which increases linearly with the inclination corresponding to the direction of arrival of the beacon light given to each pixel of the spatial light modulator 16-1, if a wavefront 30 of parallel light emitted by the lens 15-1 is incident on the spatial light modulator 16-1, the shape of the wavefront 30 changes to the shape of a wavefront 32 and the traveling direction of the light changes as illustrated in a supplementary diagram of reference sign 44 in FIG. 8. As a result, the signal light emitted by the spatial light modulator 16-1 travels, for example, in a direction shown by dashed lines in FIG. 8 while maintaining the state of parallel light.

The optical transmitting/receiving unit 14-1 superimposes transmission data given from the outside on the signal light emitted by the switching instruction unit 13-1 through an optical modulator and transmits the signal light on which the transmission data has been superimposed as an optical wireless signal (step S10).

The optical wireless communication apparatus 1-2 performs the processing of steps S4 to S10 in the same manner as in the optical wireless communication apparatus 1-1. Thus, optical wireless signals of signal light are transmitted and received between the optical wireless communication apparatus 1-1 and the optical wireless communication apparatus 1-2, and when the optical transmitting/receiving unit 14-1 of the optical wireless communication apparatus 1-1 has received an optical wireless signal of signal light transmitted by the optical wireless communication apparatus 1-2, the optical transmitting/receiving unit 14-1 detects received data from the received optical wireless signal of signal light by demodulating it through an optical demodulator. The optical transmitting/receiving unit 14-1 outputs the detected received data to the outside.

In the processing of step S7 illustrated in FIG. 3, the spatial light modulator control unit 18-1 determines whether the direction of arrival of the beacon light is the front, but an error is included in the direction of arrival of the beacon light detected by the direction detection unit 17-1. Thus, the spatial light modulator control unit 18-1 determines whether the direction of arrival of the beacon light is the front taking the error into consideration, and for example when an angle indicating the front is 0°, determines that the direction of arrival of the beacon light is the front if it is at an angle within a range of 0°±error, rather than determining whether it is at an angle of 0°.

Second Embodiment

Figure 9:
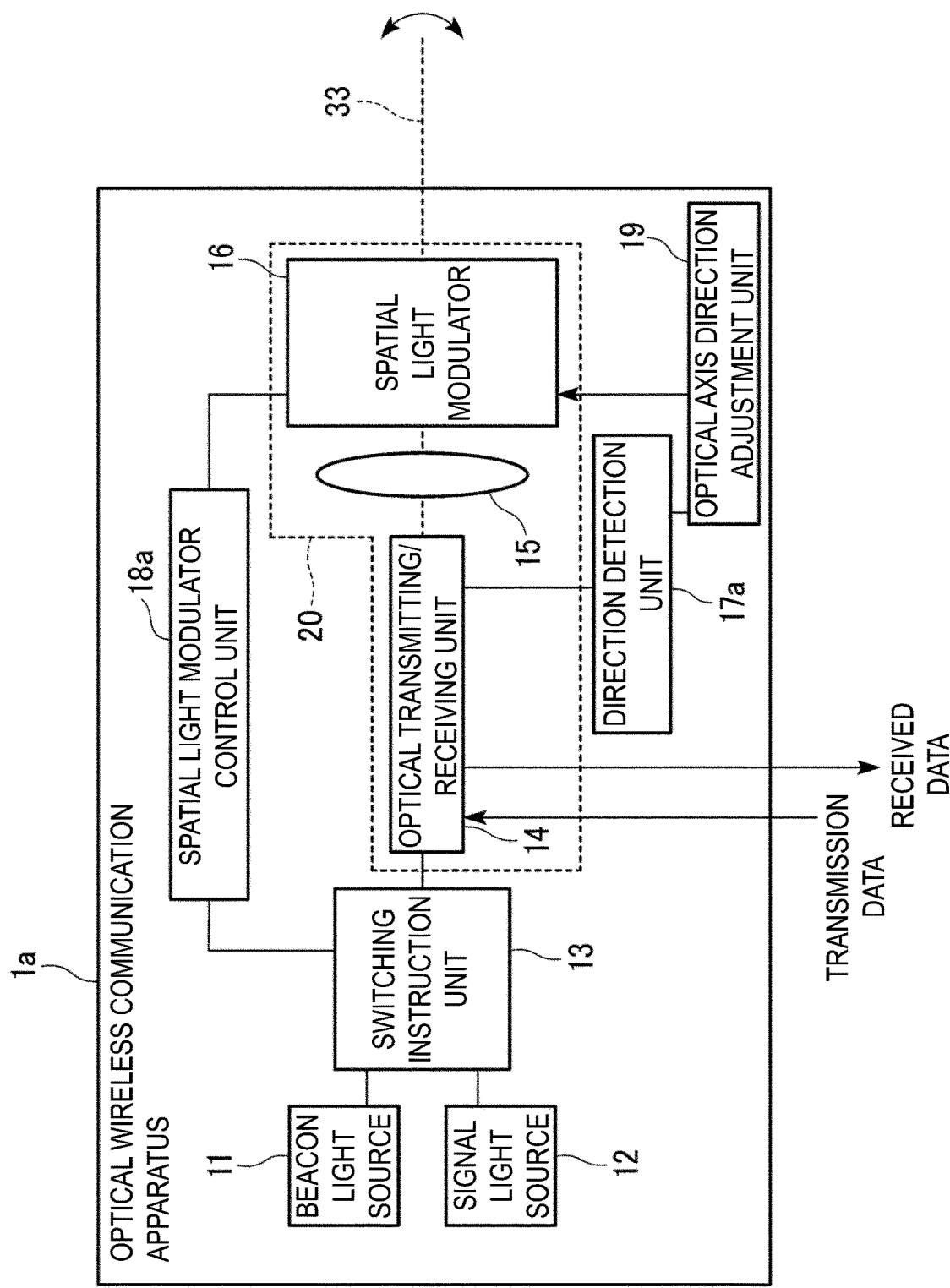
FIG. 9 is a block diagram illustrating a configuration of an optical wireless communication apparatus according to a second embodiment.

FIG. 9 is a block diagram illustrating a configuration of an optical wireless communication apparatus 1a of a second embodiment. In FIG. 9, the same components as those of the first embodiment are denoted by the same reference signs and different components will be described below. The optical wireless communication apparatus 1a includes a beacon light source 11, a signal light source 12, a switching instruction unit 13, an optical transmitting/receiving unit 14, a lens 15, a spatial light modulator 16, a direction detection unit 17a, a spatial light modulator control unit 18a, and an optical axis direction adjustment unit 19.

Similar to the direction detection unit 17 of the first embodiment, the direction detection unit 17a is connected to the optical transmitting/receiving unit 14 by an electric line. The direction detection unit 17a detects the direction of arrival of beacon light by performing calculation to estimate the direction of the optical axis of the beacon light based on light reception position information, output by the optical transmitting/receiving unit 14, indicating a position on the light receiving surface of the photodetector where the light has been received. The direction detection unit 17a is connected to the optical axis direction adjustment unit 19 by an electric line. The direction detection unit 17a outputs information indicating the detected direction of arrival of the beacon light to the optical axis direction adjustment unit 19.

Similar to the spatial light modulator control unit 18 of the first embodiment, upon receiving a beacon light selection notification signal from the switching instruction unit 13, the spatial light modulator control unit 18a gives an amount of phase shift, which makes the beam width of light transmitted through the spatial light modulator 16 wider than the beam width of the parallel light, to each pixel of the spatial light modulator 16 by a control signal. Upon receiving a signal light selection notification signal from the switching instruction unit 13, the spatial light modulator control unit 18a returns to an initial state and narrows the beam width of light transmitted through the spatial light modulator 16 such that it becomes the beam width of the parallel light. However, unlike the spatial light modulator control unit 18 of the first embodiment, the spatial light modulator control unit 18a does not receive information indicating the direction of arrival of the beacon light from the direction detection unit 17a. Thus, the spatial light modulator control unit 18a does not give an amount of phase shift, which changes the direction of light transmitted through the spatial light modulator 16, to each pixel of the spatial light modulator 16 by a control signal.

The optical axis direction adjustment unit 19 physically rotates the optical transmitting/receiving unit 14, the lens 15, and the spatial light modulator 16 based on the information indicating the direction of arrival of the beacon light output by the direction detection unit 17a. As a result, the optical axis direction adjustment unit 19 adjusts the direction of the optical axis 33 of light emitted by the optical transmitting/receiving unit 14 such that it is directed in the direction of arrival of the beacon light. For example, it is assumed that the optical transmitting/receiving unit 14, the lens 15, and the spatial light modulator 16 are fixed in one housing 20 and the optical transmitting/receiving unit 14 and the switching instruction unit 13 are connected by an optical fiber. The optical axis direction adjustment unit 19 adjusts the direction of the optical axis 33 by rotating the housing 20. For example, a gimbal is applied as the optical axis direction adjustment unit 19.

Figure 10:
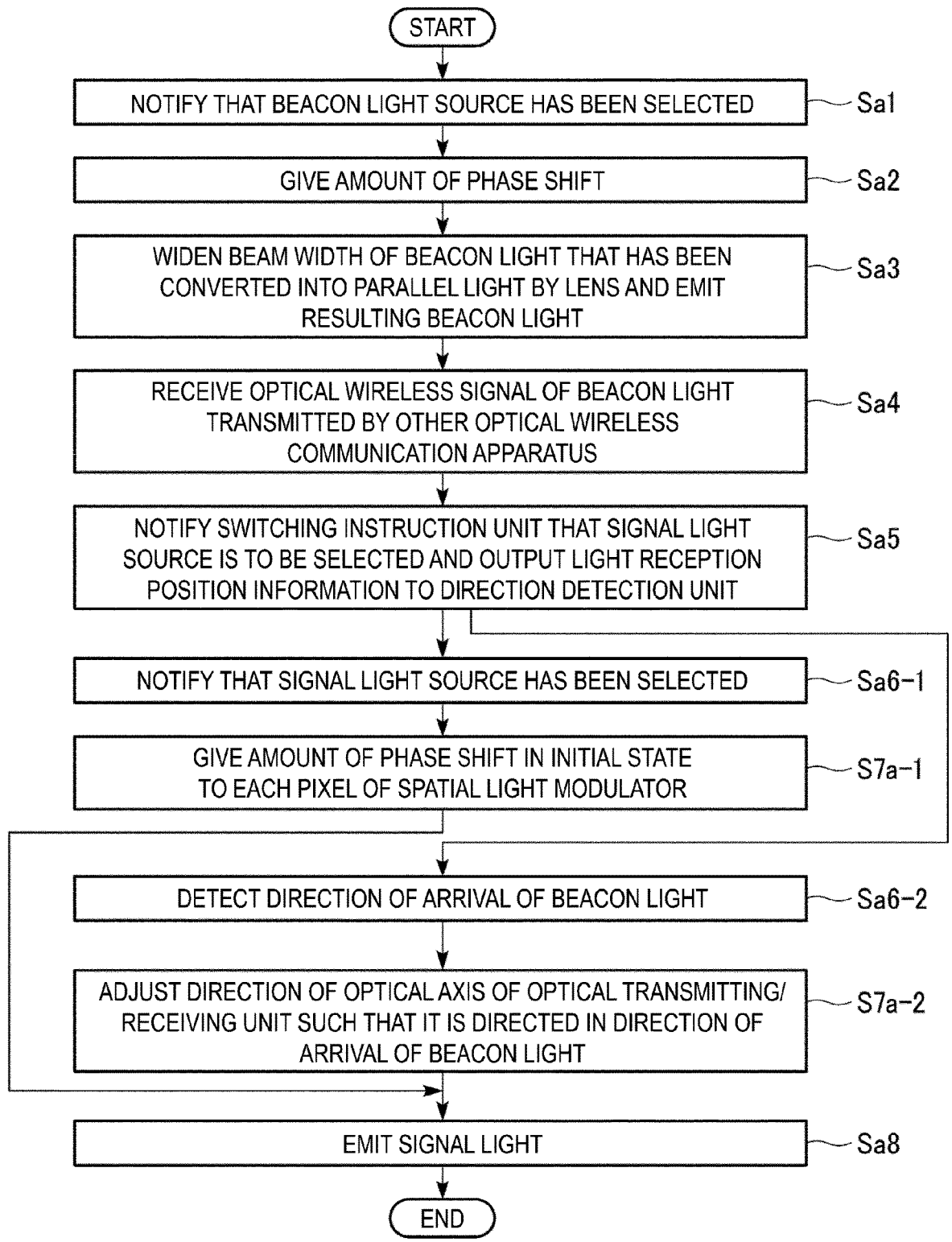
FIG. 10 is a flowchart illustrating a flow of a process performed by the optical wireless communication apparatus of the second embodiment.
Figure 11:
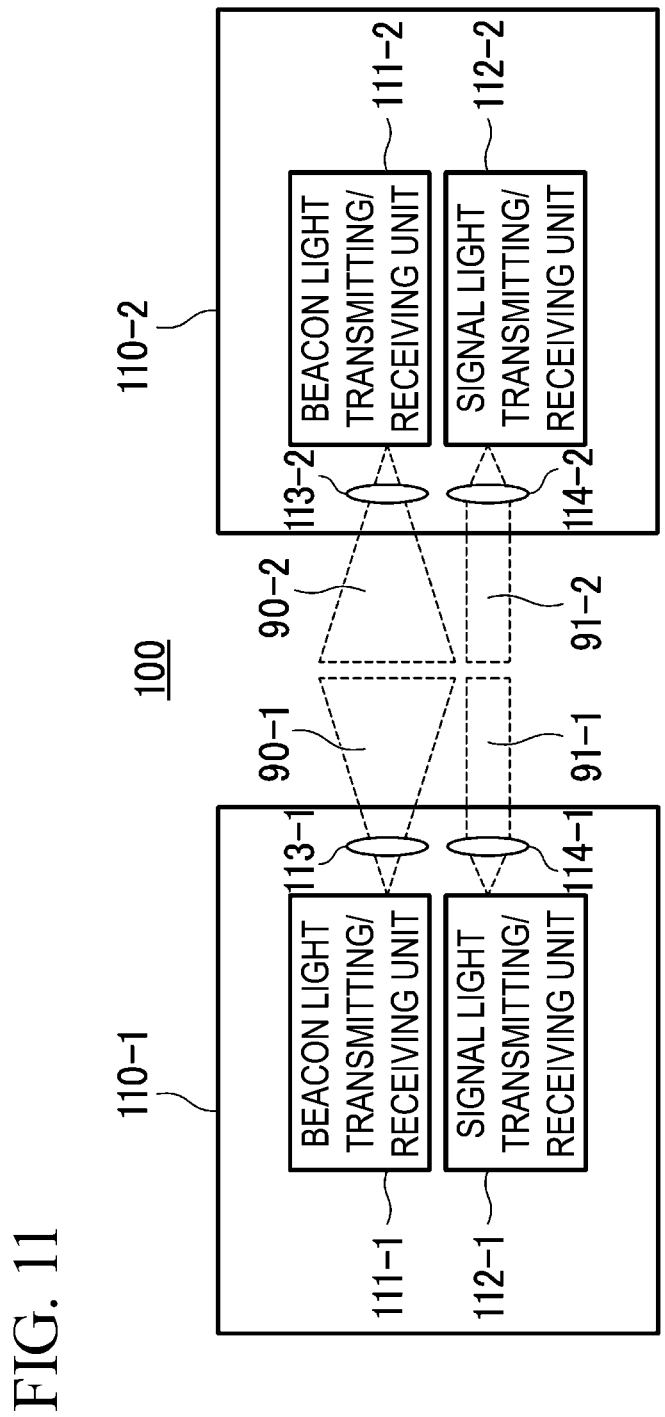
FIG. 11 is a block diagram illustrating a configuration of an optical wireless communication system showing an overview of a technology disclosed in NPL 1.

Process Performed by Optical Wireless Communication Apparatus in Second Embodiment FIG. 10 is a flowchart illustrating a flow of a process performed by the optical wireless communication apparatus 1a of the second embodiment. For ease of explanation, the process performed by the optical wireless communication apparatus 1a of the second embodiment will be described assuming an optical wireless communication system 5a including two optical wireless communication apparatuses 1a-1 and 1a-2 having the same configuration as the optical wireless communication apparatus 1a of the second embodiment, similar to the optical wireless communication system 5 of the first embodiment illustrated in FIG. 2.

Of functional units of the two optical wireless communication apparatuses 1a-1 and 1a-2 corresponding to the functional units included in the optical wireless communication apparatus 1a, those of the optical wireless communication apparatus 1a-1 will be indicated by a branch number "-1" added and those of the optical wireless communication apparatus 1a-2 will be indicated by a branch number "-2" added.

In the second embodiment, the process performed by the optical wireless communication apparatus 1a-1 will be described below because the optical wireless communication apparatuses 1a-1 and 1a-2 perform the same process, similar to the first embodiment.

As processing of steps Sa1 to Sa5, the optical wireless communication apparatus 1a-1 performs the same processing as that of steps S1 to S5 illustrated in FIG. 3.

Upon receiving the capture notification signal from the optical transmitting/receiving unit 14-1, the switching instruction unit 13-1 selects and receives the signal light emitted by the signal light source 12-1. The switching instruction unit 13-1 emits the received signal light to the optical transmitting/receiving unit 14-1. The switching instruction unit 13-1 outputs a signal light selection notification signal to the spatial light modulator control unit 18a-1 (step S6a-1).

Upon receiving the signal light selection notification signal from the switching instruction unit 13-1, the spatial light modulator control unit 18a-1 returns to the initial state and gives an amount of phase shift, which causes the same fixed phase delay, to each pixel of the spatial light modulator 16-1 by a control signal (step S7a-1). Thereby, if parallel signal light is incident on the spatial light modulator 16-1 when the optical transmitting/receiving unit 14-1 transmits an optical wireless signal of the signal light, the signal light of the incident parallel signal undergoes the same phase delay when it is transmitted through each pixel. Thus, the signal light is transmitted through the pixels of the spatial light modulator 16-1 while maintaining the state of parallel light and propagates to the optical wireless communication apparatus 1a-2 as parallel light with a beam width narrower than that of the beacon light.

In parallel with the processing of steps Sa6-1 and Sa7-1, the direction detection unit 17a-1 performs calculation to estimate the direction of the optical axis of the beacon light transmitted by the optical wireless communication apparatus 1a-2 based on light reception position information received from the optical transmitting/receiving unit 14-1. Thereby, the direction detection unit 17a-1 detects the direction of arrival of the beacon light, that is, the direction in which the optical wireless communication apparatus 1a-2 is present. The direction detection unit 17a-1 outputs information indicating the detected direction of arrival of the beacon light to the optical axis direction adjustment unit 19-1 (step S6a-2).

In parallel with the processing of steps Sa6-1 and Sa7-1, the optical axis direction adjustment unit 19-1 physically rotates the housing 20 based on the information indicating the direction of arrival of the beacon light output by the direction detection unit 17a-1. As a result, the optical axis direction adjustment unit 19-1 adjusts the direction of the optical axis 33 of light emitted by the optical transmitting/receiving unit 14 such that it is directed in the direction of arrival of the beacon light transmitted by the optical wireless communication apparatus 1a-2 (step Sa7-2).

The optical transmitting/receiving unit 14-1 superimposes transmission data given from the outside on the signal light emitted by the switching instruction unit 13-1 through an optical modulator and transmits the signal light on which the transmission data has been superimposed as an optical wireless signal (step Sa8).

The optical wireless communication apparatus 1a-2 performs the processing of steps Sa1 to Sa8 in the same manner as in the optical wireless communication apparatus 1a-1. Thus, optical wireless signals of signal light are transmitted and received between the optical wireless communication apparatus 1a-1 and the optical wireless communication apparatus 1a-2, and when the optical transmitting/receiving unit 14-1 of the optical wireless communication apparatus 1a-1 has received an optical wireless signal of signal light transmitted by the optical wireless communication apparatus 1a-2, the optical transmitting/receiving unit 14-1 detects received data from the received optical wireless signal of signal light by demodulating it through an optical demodulator and outputs the detected received data to the outside.

In each of the optical wireless communication apparatuses 1 and 1a of the first and second embodiments described above, the optical transmitting/receiving unit 14 transmits an optical wireless signal of beacon light or signal light and receives an optical wireless signal transmitted by the other optical wireless communication apparatuses 1 and 1a. The switching instruction unit 13 outputs a beacon light selection notification signal when the optical transmitting/receiving unit 14 transmits an optical wireless signal of beacon light and outputs a signal light selection notification signal when the optical transmitting/receiving unit 14 transmits an optical wireless signal of signal light upon receiving an optical wireless signal of beacon light from the other optical wireless communication apparatuses 1 and 1a. The lens 15 is arranged at a position where light of the optical wireless signal transmitted by the optical transmitting/receiving unit 14 is converted into and emitted as parallel light by the lens 15. The spatial light modulator 16 is arranged at a position where the parallel light emitted by the lens 15 is transmitted through the spatial light modulator 16 and has a plurality of pixels, each of which causes a phase delay in light transmitted therethrough based on a given control signal. The spatial light modulator control unit 18 and 18a performs switching of a control signal given to each pixel of the spatial light modulator 16 such that when the switching instruction unit 13 outputs a beacon light selection notification signal, a phase delay which makes the beam width of beacon light wider than the beam width of parallel light is caused in light transmitted through each pixel of the spatial light modulator 16, and when the switching instruction unit 13 outputs a signal light selection notification signal, a phase delay which makes the beam width of signal light become the beam width of parallel light is caused in light transmitted through each pixel of the spatial light modulator 16.

As a result, the optical wireless communication apparatuses 1 and 1a can transmit optical wireless signals of both beacon light and signal light using one optical transmitting/receiving unit 14 and one lens 15. That is, by adjusting the amount of phase shift given to each pixel of the spatial light modulator 16, the optical wireless communication apparatuses 1 and 1a can perform transmission with a beam width of beacon light being wider than the beam width of parallel light when transmitting an optical wireless signal of the beacon light and can perform transmission with a beam width of signal light being equal to the beam width of parallel light when transmitting an optical wireless signal of the signal light. In this way, using a single transmission system, it is possible to capture an opposite optical wireless communication apparatuses 1 and 1*a* and perform communication through an optical wireless signal and thus it is possible to reduce the size and cost of the optical wireless communication apparatuses 1 and 1*a* while enabling transmission of both beacon light and signal light.

In the first and second embodiments described above, the wavelength of beacon light emitted by the beacon light source 11 included in the optical wireless communication apparatuses 1 and 1*a* and the wavelength of signal light emitted by the signal light source 12 may be the same or may be different. For example, when there are two different optical wireless communication apparatuses 1-1 and 1-2 as in the optical communication system 5 illustrated in FIG. 2 of the first embodiment and when there are two different optical wireless communication apparatuses 1*a*-1 and 1*a*-2 included in the optical communication system 5*a* shown in the process of the second embodiment in the case where the wavelengths of beacon light and signal light are different, the wavelengths of beacon light emitted by the beacon light sources 11-1 and 11-2 may be different.

Further, when the wavelength of beacon light and the wavelength of signal light are the same, the optical wireless communication apparatuses 1 and 1*a* each do not need to include both the beacon light source 11 and the signal light source 12 and may instead include one signal light source and connect the one signal light source to the optical transmitting/receiving unit 14 by optical means without using the switching instruction unit 13. In this case, the switching instruction unit 13 does not perform a process of switching between beacon light emitted by the beacon light source 11 and signal light emitted by the signal light source 12 but instead performs a process of outputting a beacon light selection notification signal to the spatial light modulator control unit 18 and 18*a* in an initial state and outputting a signal light selection notification signal to the spatial light modulator control unit 18 and 18*a* upon receiving a capture notification signal from the optical transmitting/receiving unit 14.

Further, when the wavelength of beacon light and the wavelength of signal light are the same, the optical transmitting/receiving unit 14 does not need to include an optical amplifier for each wavelength, thus enabling a further reduction in the size and cost.

The optical transmitting/receiving unit 14-1 transmits an optical wireless signal of beacon light in the processing of steps S3 and Sa3 of the first and second embodiments described above and transmits an optical wireless signal of signal light in the processing of steps S10 and Sa8. This order is for ease of explanation showing the flow of processing. Actually, the optical transmitting/receiving unit 14-1 starts transmitting an optical wireless signal of beacon light or signal light at the timing when the switching instruction unit 13-1 has switched the selected light. That is, the emission of beacon light of the optical transmitting/receiving unit 14-1 in the processing of steps S3 and Sa3 is performed at the timing of steps S1 and Sa1. The emission of signal light of the optical transmitting/receiving unit 14-1 in the processing of steps S10 and Sa8 is performed at the timing of steps S6-1 and Sa6-1. When such processing is performed, the beam width of beacon light is not widened, the beam width of signal light is not narrowed, and the direction of the signal light is not directed in the direction of arrival of beacon light transmitted by the optical wireless communication apparatus 1-2 and 1*a*-2 until application of an amount of phase shift to each pixel of the spatial light modulator 16-1 is completed. Here, presuming a time until the spatial light modulator control unit 18-1 and 18*a*-1 completes outputting a control signal to each pixel of the spatial light modulator 16-1 as illustrated in the flowcharts of FIGS. 3 and 10, the optical transmitting/receiving unit 14-1 may delay the processing and start transmitting an optical wireless signal of beacon light at the timing of steps S3 and Sa3 and start transmitting an optical wireless signal of signal light at the timing of steps S10 and Sa8.

The first and second embodiments described above show an example in which a transmissive SLM is applied as the spatial light modulator 16, 16-1, and 16-2, but a reflective SLM may also be applied.

The first and second embodiments described above show an example in which the lens 15, 15-1, and 15-2 is applied. As described above, the lens 15, 15-1 and 15-2 is a convex lens or a lens antenna that combines a convex lens and a concave lens and is an optical antenna having a so-called refracting telescope configuration, but the present invention is not limited to an optical antenna of a lens antenna type and any type of optical antenna may be applied. For example, an optical antenna having a reflecting telescope configuration such as a Cassegrain telescope may be applied.

A configuration relating to electrical control of the switching instruction unit 13, the optical transmitting/receiving unit 14, the direction detection unit 17 and 17*a*, and the optical axis direction adjustment unit 19 in the above embodiments and the spatial light modulator control unit 18 and 18*a* may be implemented by a computer. In this case, a program for implementing the functions may be recorded on a computer readable recording medium and the functions may then be implemented by causing a computer system to read and execute the program recorded on the recording medium. The "computer system" referred to here includes an OS or hardware such as peripheral devices. The "computer readable recording medium" refers to a portable medium such as a flexible disk, a magneto-optical disc, a ROM, or a CD-ROM, a storage device such as a hard disk provided in the computer system, or the like.

The "computer readable recording medium" may include something that dynamically holds a program for a short time, like a communication wire in the case in which the program is transmitted via a communication line such as a telephone line or a network such as the Internet, or may include something that holds a program for a certain period of time, like an internal volatile memory of a computer system that serves as a server or a client in that case. The program may be one for implementing some of the above-described functions or one which can implement the above-described functions in combination with a program already recorded in the computer system or may be one implemented using a programmable logic device such as a field programmable gate array (FPGA).

Although embodiments of the present invention have been described above in detail with reference to the drawings, the specific configurations thereof are not limited to those of the embodiments and also include designs or the like without departing from the spirit of the present invention.

INDUSTRIAL APPLICABILITY

The above optical wireless communication apparatus can be used as an optical wireless communication apparatus that captures an opposite optical wireless communication apparatus by using beacon light.

REFERENCE SIGNS LIST

1 Optical wireless communication apparatus
11 Beacon light source

12 Signal light source
13 Switching instruction unit
14 Optical transmitting/receiving unit
15 Lens
16 Spatial light modulator
17 Direction detection unit
18 Spatial light modulator control unit

The invention claimed is:

1. An optical wireless communication apparatus comprising:
- an optical transceiver configured to transmit an optical wireless signal of beacon light or signal light and receive an optical wireless signal transmitted by another optical wireless communication apparatus;
- a switching instructor configured to output a beacon light selection notification signal when the optical transceiver transmits the optical wireless signal of the beacon light and output a signal light selection notification signal when the optical transceiver transmits the optical wireless signal of the signal light upon receiving an optical wireless signal of the beacon light from the other optical wireless communication apparatus;
- an optical antenna arranged at a position where light of the optical wireless signal transmitted by the optical transceiver is converted into and emitted as parallel light;
- a spatial light modulator arranged at a position where the spatial light modulator receives the parallel light emitted by the optical antenna, the spatial light modulator having a plurality of pixels, each of which causes a phase delay in light received by the pixel based on a given control signal; and
- a spatial light modulator controller configured to perform switching of the control signal given to each of the plurality of pixels of the spatial light modulator to:
  - cause a phase delay, which causes a beam width of the beacon light to be wider than a beam width of parallel light, in light received by each of the plurality of pixels of the spatial light modulator when the switching instructor outputs the beacon light selection notification signal,
  - cause a phase delay, which causes a beam width of the signal light to be equal to a beam width of parallel light, in light received by each of the plurality of pixels of the spatial light modulator when the switching instructor outputs the signal light selection notification signal,
  - further comprising a direction detector configured to detect a direction of arrival of the beacon light when the optical transceiver has received the beacon light from the other optical wireless communication apparatus,
    - wherein a direction of the signal light is caused to be directed in the direction of arrival of the beacon light detected by the direction detector when the switching instructor outputs the signal light selection notification signal,
    - wherein the spatial light modulator controller is configured to output a control signal, which causes a phase delay linearly increasing according to an inclination corresponding to the direction of arrival of the beacon light detected by the direction detector in the signal light received by each of the plurality of pixels of the spatial light modulator, to each of the plurality of pixels of the spatial light modulator and cause the direction of the signal light to be directed in the direction of arrival of the beacon light.

2. The optical wireless communication apparatus according to claim 1, wherein the spatial light modulator controller is configured to output a control signal, which causes a phase delay increasing exponentially according to a distance from a central one of the plurality of pixels in light received by each of the plurality of pixels of the spatial light modulator, to each of the plurality of pixels of the spatial light modulator to cause the beam width of the beacon light to be wider than the beam width of parallel light when the switching instructor outputs the beacon light selection notification signal.

3. The optical wireless communication apparatus according to claim 1, wherein the spatial light modulator controller is configured to output a control signal, which causes an identical fixed phase delay in light received by each of the plurality of pixels of the spatial light modulator, to each of the plurality of pixels of the spatial light modulator in an initial state and return to the initial state to cause the beam width of the signal light to be equal to the beam width of parallel light when the switching instructor outputs the signal light selection notification signal.

4. An optical wireless communication method for an optical wireless communication apparatus including a switching instructor, an optical transceiver configured to transmit and receive an optical wireless signal, an optical antenna arranged at a position where light of the optical wireless signal transmitted by the optical transceiver is converted into and emitted as parallel light, a spatial light modulator arranged at a position where the spatial light modulator receives the parallel light emitted by the optical antenna, the spatial light modulator having a plurality of pixels, each of which causes a phase delay in light received by the pixel based on a given control signal, and a spatial light modulator controller, the optical wireless communication method comprising:
- outputting, by the switching instructor, a beacon light selection notification signal;
- transmitting, by the optical transceiver, an optical wireless signal of beacon light;
- by the optical antenna, converting light of the optical wireless signal transmitted by the optical transceiver into parallel light and emitting the parallel light to the spatial light modulator;
- by the spatial light modulator controller, receiving the beacon light selection notification signal output by the switching instructor and giving, to each of the plurality of pixels of the spatial light modulator, the control signal which causes a phase delay, which causes a beam width of the beacon light to be wider than a beam width of parallel light, in light received by each of the plurality of pixels of the spatial light modulator;
- outputting, by the switching instructor, a signal light selection notification signal when the optical transceiver has received an optical wireless signal of the beacon light from another optical wireless communication apparatus;
- transmitting, by the optical transceiver, an optical wireless signal of the signal light;
- by the optical antenna, converting light of the optical wireless signal transmitted by the optical transceiver into parallel light and emitting the parallel light to the spatial light modulator; and
- by the spatial light modulator controller, receiving the signal light selection notification signal output by the switching instructor and performing switching of the control signal given to each of the plurality of pixels of the spatial light modulator to cause a phase delay, which causes a beam width of the signal light to be equal to a beam width of parallel light, in light received by each of the plurality of pixels of the spatial light modulator, wherein the optical wireless communication apparatus further includes a direction detector, the direction detector detects a direction of arrival of the beacon light when the optical transceiver has received the beacon light from the other optical wireless communication apparatus, and a direction of the signal light is caused to be directed in the direction of arrival of the beacon light detected by the direction detector when the switching instructor outputs the signal light selection notification signal, wherein the spatial light modulator controller is configured to output a control signal, which causes a phase delay linearly increasing according to an inclination corresponding to the direction of arrival of the beacon light detected by the direction detector in the signal light received by each of the plurality of pixels of the spatial light modulator, to each of the plurality of pixels of the spatial light modulator and cause the direction of the signal light to be directed in the direction of arrival of the beacon light.

* * * * *